Figure 1:
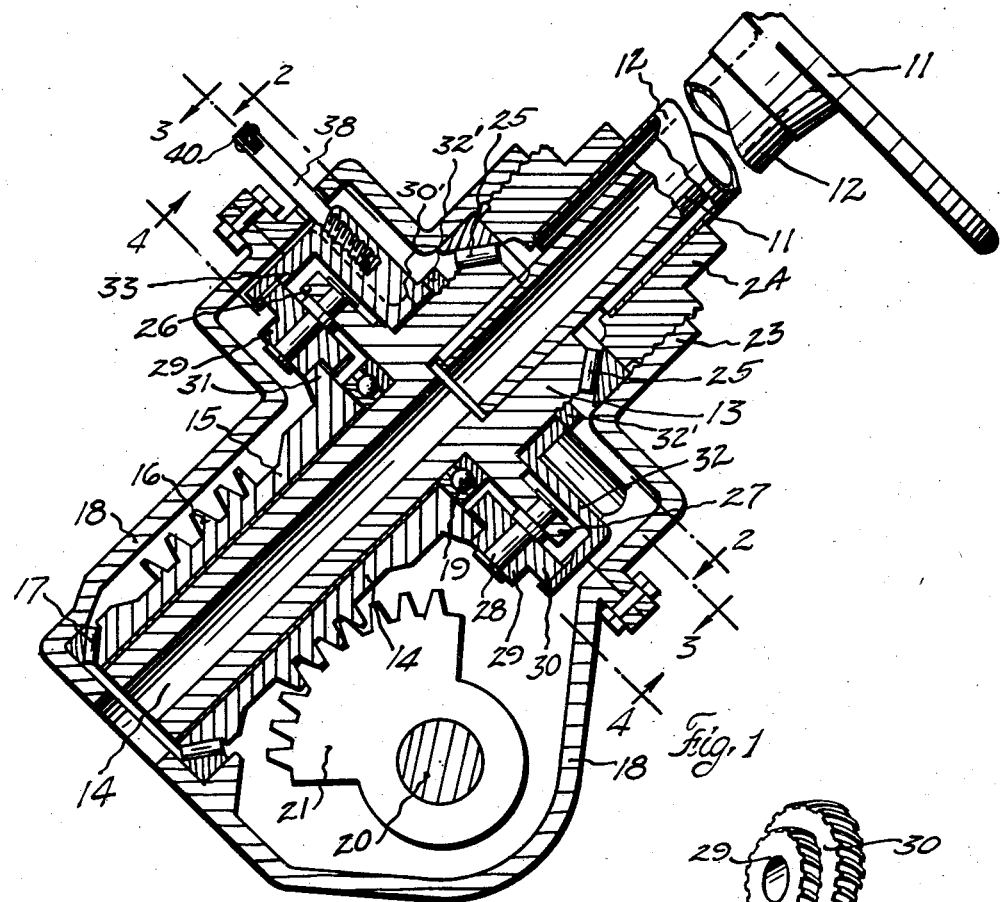

Nov. 20, 1934.　　　M. H. EDMONDSON　　　1,981,591
CONTROL MECHANISM
Filed July 13, 1933　　　2 Sheets-Sheet 1

Inventor
Morton H. Edmondson
By Jack A. Ackley
Attorney

Nov. 20, 1934.  M. H. EDMONDSON  1,981,591
CONTROL MECHANISM
Filed July 13, 1933   2 Sheets-Sheet 2
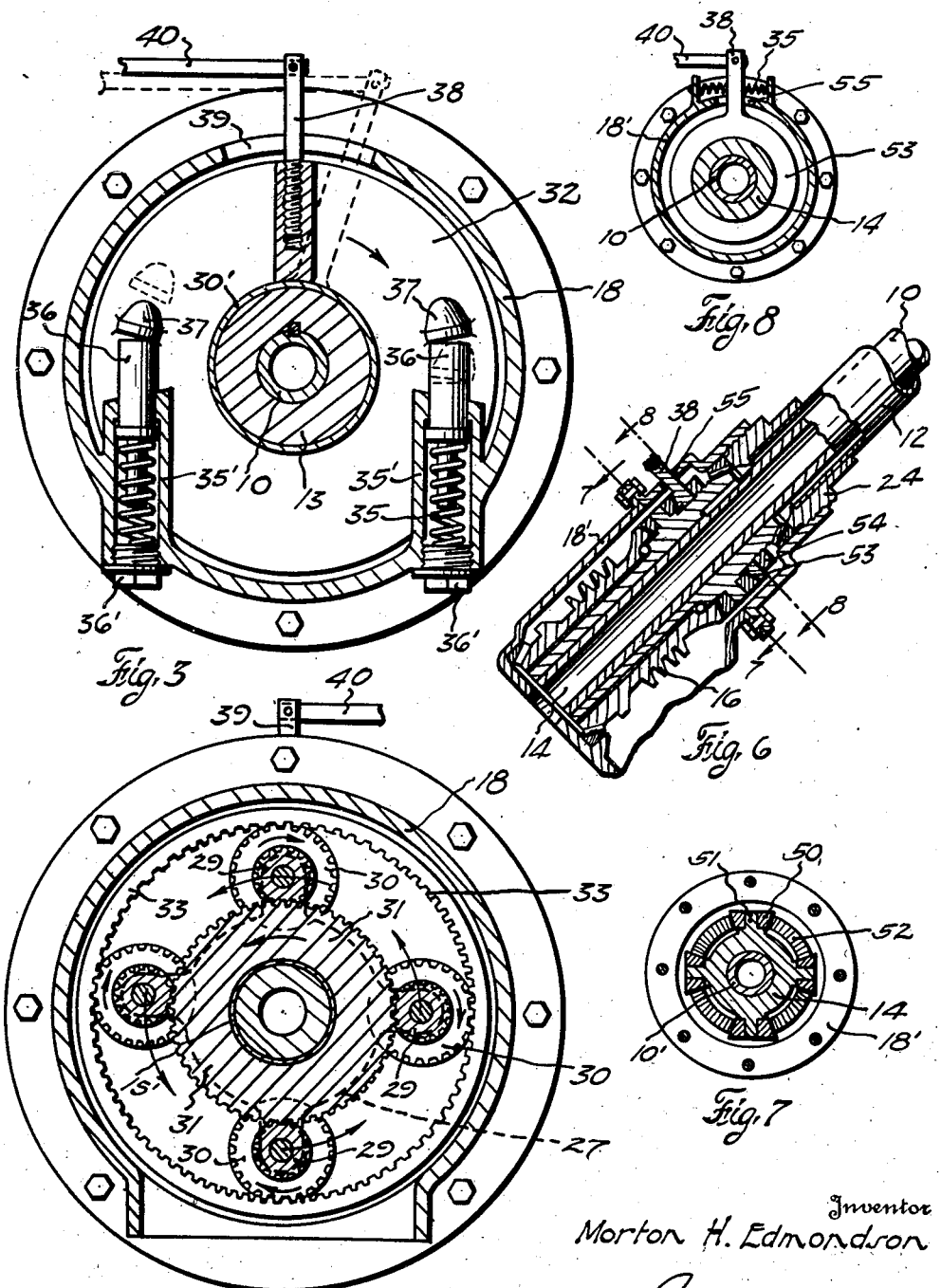

Patented Nov. 20, 1934

1,981,591

UNITED STATES PATENT OFFICE 1,981,591

CONTROL MECHANISM

Morton H. Edmondson, Greenville, Tex.

Application July 13, 1933, Serial No. 680,271

8 Claims. (Cl. 180—79)

This invention relates to new and useful improvements in control mechanism.

One object of the invention is to provide an improved control mechanism which may be incorporated with the usual steering control for motor vehicles and which will efficiently control the auxiliary power applied to the steering mechanism of said vehicle.

An important object of the invention is to provide an improved control mechanism for power steering of motor vehicles which will be idle under normal steering conditions but which will apply power when steering becomes difficult, as on a turn; said control mechanism automatically cutting off the power when the necessity or desirability of using power has ceased, thereby allowing the steering mechanism to be manually controlled in the usual way.

A further object of the invention is to provide an improved control mechanism for power steering of motor vehicles which is so arranged as to permit the use of various gear ratios between the steering wheel and the steering sector, whereby a maximum turning of said sector is had with a minimum of effort on the part of the driver in turning the steering wheel.

Another object of the invention is to provide an improved control mechanism for power steering of motor vehicles, and for other purposes, which includes a differential gear unit, or other suitable transmitting element, for transmitting motion from the steering wheel to the steering worm of said vehicle, and means on the planetary gearing unit arranged to control the application of auxiliary power to the steering mechanism, said means being normally held stationary to prevent application of power, whereby the steering of the vehicle is controlled manually in the usual way under normal steering conditions; said means also being movable to apply power when steering becomes difficult.

A further object of the invention is to provide an improved control mechanism for power steering of motor vehicles which includes a differential unit arranged to transmit motion from the steering wheel to the steering worm of said vehicle, the unit being arranged to also transmit motion from the steering wheel to a control which applies power to the steering mechanism of the vehicle when a predetermined resistance is offered to the steering wheel of said vehicle.

An important object of the invention is to provide an improved control mechanism which may be incorporated with the usual steering gear of a motor vehicle, whereby the controlling means of a suitable auxiliary power steering device may be set to operate when abnormal loads are built up in the steering gear.

Another object of the invention is to provide improved means arranged to be incorporated in the steering control of a motor vehicle which will increase the speed of rotation of the steering worm with relation to the rotation of the steering shaft, whereby the teeth of the steering worm and the steering sector may be given a lesser pitch to make the mechanism self-locking and prevent backlash without changing the ratio between the steering shaft and the sector.

Another object of the invention is to provide an improved control mechanism arranged to be incorporated in the steering control of a motor vehicle and including means positioned between the steering shaft and the steering sector of said vehicle for proportioning the power applied to the steering shaft so as to apply a maximum of said power to the steering sector and a minimum to the controlling means for the auxiliary power connected with the steering mechanism of said vehicle.

A construction designed to carry out the invention will be hereinafter described, together with other features of the invention.

Figure 5:
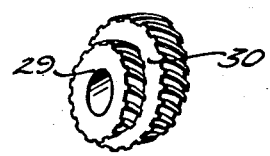
Figure 2:
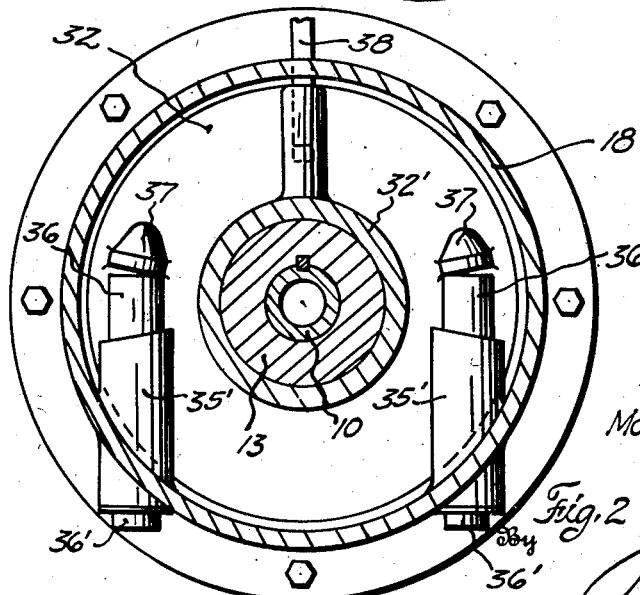

The invention will be more readily understood from a reading of the following specification and by reference to the accompanying drawings in which an example of the invention is shown, and wherein:

Figure 1 is a longitudinal sectional view of a control mechanism constructed in accordance with the invention, Figure 2 is a transverse sectional view of the same, taken on the line 2—2 of Figure 1, Figure 3 is a transverse sectional view, taken on the line 3—3 of Figure 1, Figure 4 is a transverse sectional view taken on the line 4—4 of Figure 1, Figure 5 is a detail of one of the reduction gears of the planetary gear unit, Figure 6 is a longitudinal sectional view of another form of the invention, Figure 7 is a transverse sectional view, taken on the line 7—7 of Figure 6, and Figure 8 is a transverse sectional view, taken on the line 8—8 of Figure 6.

In the drawings I have shown the invention as used in combination with the steering control of a motor vehicle. The numeral 10 designates the steering shaft which has the steering wheel 11 secured on its upper end. The usual tubular sleeve or casing 12 surrounds the shaft. The lower end of the shaft 10 is keyed into the head 13 of a tubular mandrel 14, and it is obvious that as the steering wheel is turned to rotate the shaft within the housing 12, the mandrel 14 is rotated therewith.

A steering worm sleeve 15 carrying the steering worm 16 is journaled on the lower end of the mandrel 14. The lower end of the sleeve 15 is supported by roller bearings 17 within a case or housing 18, which is suitably secured to the motor vehicle. Thrust bearings 19 are mounted between the upper end of the sleeve 15 and the lower end of the mandrel head 13, and it will be seen that the sleeve 15 is rotatably mounted on the mandrel 14 between these thrust bearings and the roller bearings 17. A bearing bushing 15', of brass or other suitable material, is inserted in the sleeve 15.

The housing 18 is constructed in two sections which are connected and held together by bolts 18'. The lower section of the housing supports the shaft 20 of a worm sector 21 which is positioned within the housing and is in constant engagement with the steering worm 16. The sector shaft 20 is connected with the steering mechanism (not shown), which may vary according to the particular motor vehicle.

The upper section of the housing is provided with an internally screw-threaded collar 23 which receives a cap 24. The lower end of the sleeve 12 which surrounds the steering shaft telescopes into this cap. The cap serves to retain roller bearings 25 in constant engagement with the upper end of the mandrel head 13, whereby said head and its mandrel 14 are easily rotated. With the construction above described, it is obvious that by turning the steering wheel 11, the steering shaft 10 is rotated. This, in turn, will rotate the head 13 and mandrel 14 keyed thereto. It is pointed out that the mandrel 14 will rotate within the worm sleeve 15 since the latter is rotatably mounted on said mandrel.

For transmitting motion from the steering shaft 10 and the mandrel 14 to the worm member 15, I provide a differential gearing unit 26. The unit includes a spider 27 which is preferably made integral with the mandrel head 13. Each arm of the spider carries a stub shaft 28, on which is journaled a pinion 29 and gear 30. The pinion 29 and gear 30 are preferably made integral with each other, as clearly shown in Figure 5.

The sun gear 31 of the differential unit is carried at the upper end of the worm sleeve 15 and is made integral therewith. The sun gear 31 is in constant engagement with the pinions 29 carried by the spider 27. A differential bell housing 32 is rotatably mounted on the mandrel head 13, being retained thereon by a collar 32', which is screw-threaded on the upper end of the head 13. A suitable bushing 30' is inserted in the central bore of the bell housing.

The flange of the bell housing 32 is provided with an internal gear ring 33, which is engaged by the gears 30 carried by the spider 27. It is obvious that with the above described arrangement, rotation of the spider will rotate either the worm gear sleeve 15 through the pinions 29, or the bell housing 32 through the gears 30 and gear ring 33. As clearly shown in Figure 5, each pinion 29 and gear 30 are provided with spiral cogs so that smoother operation is had as the transmission of motion changes from one to the other.

For holding the bell housing stationary under normal steering conditions so as to permit motion from the steering shaft to be transmitted to the worm sleeve 15 through the pinions 29 and sun gear 31, a pair of equalizing springs 35 are provided. As shown in Figure 3, each spring is confined within a casing 35', made integral with the housing 18, by a plunger 36 and a nut 36'. The springs, bearing against the lower end of the plungers 36, serve to hold said plungers in constant engagement with lugs 37 secured on the upper side of the bell housing 32. The pressure of the springs is equal and they balance each other, thereby holding the bell housing 32, which is rotatably mounted on the mandrel head 13, in a neutral position. The bell housing carries an operating lever 38 which extends upwardly through a slot 39 in the upper section of the housing 18. A link 40 is pivoted to the upper end of the lever and has its other end connected to a valve, or other means of control (not shown), for the vacuum, pressure, or other power used for aiding the steering of the vehicle. With the springs 35 holding the bell housing in a neutral position, the lever 38 is in an upright position (Figure 3), and the valve, or other means of control, is closed and the power is entirely cut off.

Upon turning the steering wheel 11, the mandrel 14, head 13, and spider 27 are rotated. The equalizing springs 35, bearing against the plungers 36 engaging the lugs 37 on the bell housing 32, hold the bell housing in a neutral and stationary position, and the motion, following the line of least resistance, is transmitted through the pinions 29 to the sun gear 31, thereby rotating the worm 16 which swings the gear sector 21. The sector being connected with the steering mechanism, turns the front wheels of the vehicle. At this time the gears 30 are traveling around the internal gear 33 of the bell housing. It is pointed out that the turning of the wheels to this point has been done manually in the usual way.

As the front wheels of the vehicle are turning, a resistance is offered making them harder to turn as the angle from the center line of the car increases. It is when this resistance is offered that power is necessary to aid the driver of the car. As soon as this resistance on the front wheels is sufficient to overcome the pressure of the equalizing springs 35, the worm sleeve 15 will become stationary and the motion from the steering shaft 10, still following the line of least resistance, will be transmitted to the bell housing 32 through the gears 30 and the gear ring 33. This will rotate the bell housing one way or the other, depending upon which way the front wheels are being turned, and the lever 38 will be swung off-center (Figure 3, dotted lines), which action will operate the link 40 to open the control means connected thereto and apply power to the steering mechanism. The bell housing can rotate only a limited distance, due to the lugs 37 striking the upper ends of the casings 35'. Thus it is seen that the lugs 37 not only serve as a means whereby the equalizing springs can exert their pressure on the bell housing, but also provide a stop means for limiting the rotation of the bell housing.

After power has been applied and the wheels are turned, the resistance has been overcome. As soon as this resistance is again less than the pressure of the springs 35, the springs immediately equalize to return the bell housing 32 to a neutral position and cut off the power. It is obvious that power is applied only when there is sufficient resistance on the front wheels of the vehicle to overcome the pressure of the springs 35.

By varying the pressure on these springs a predetermined resistance on the front wheels or on the worm 16 is necessary before the power is applied. As soon as the resistance is overcome, the springs 35 will immediately return the bell housing to a neutral position. It is readily seen that there is no waste of power, as the power is applied when needed, and cut off as soon as this necessity ceases.

The device is constructed of few parts and is easily adjusted to apply power at any predetermined resistance on the swinging of the sector 21. The size of the pinions 29, which are carried by the spider 27 and engage the sun gear 31, control the gear ratio between the steering wheel 11 and steering worm 16 and variations may easily be made. By providing the differential gearing unit to transmit motion to the worm 16, the rotation of the worm is increased, thereby permitting the teeth of the worm 16 and gear sector 21 to be of a lesser pitch without changing the ratio between the steering shaft and the sector. Thus the gear and sector become self-locking, thereby preventing the sector from turning the worm and operating the entire mechanism in a reverse direction, due to the front wheels turning slightly upon striking an obstruction in the road, or for any other reason.

By varying the size of the pinions 29 and gears 30, it is also possible to distribute, as desired, the power which has been applied to the steering shaft 10, to the worm 16 and the bell housing 32. In other words, the pinions and gears may be of such size so that seventy-five per cent of the power applied to the steering shaft is transmitted to the worm sleeve 15 and twenty-five per cent is transmitted to the bell housing 32. Thus, only the power needed is transmitted to the bell housing, the remainder being applied to rotate the worm sleeve, whereby no waste of power is had.

In Figures 6 to 8, I have shown a modified form of the invention. Instead of the differential gearing unit 26, I provide another form of differential which includes a plurality of pinions 50 which are carried by stub shafts 51 made integral with the mandrel 14. The worm gear sleeve 15 is provided with a gear ring 52 at its upper end which is engaged by the pinions 50. The pinions also engage a ring gear 53 rotatably mounted on the mandrel 14 and retained thereon by a screw-threaded collar 54. The ring gear carries the operating lever 38 which extends upwardly through a slot 55 in the outer housing 18'. The operating rod has the link 40 pivoted thereto. The operation of this form is similar to that in the form shown in Figures 1 to 5, the pinion 50 transmitting motion from the steering shaft 10 either to the worm 16 or the ring gear 53, depending on the resistance on the worm 16.

The equalizing springs 35, as shown in Figures 1 to 5, can, if desired, be also used in this form. However, it is pointed out that the particular way of positioning the springs is unimportant as various ways can be worked out. In Figure 8, the springs 35 are shown mounted on either side of the operating lever 38. It is obvious that so long as the pressure of the springs exceeds the force of resistance against the front wheels, said springs will hold the control means for the auxiliary power device (not shown) closed and no power is applied.

The description which has been given, recites more or less detail of a particular embodiment of the invention, which is set forth as new and useful, however, I desire it understood that the invention is not limited to such exact details of construction because it is manifest that changes and modifications may be made, within the scope of the appended claims, without departing from the spirit of the invention.

What I claim and desire to secure by Letters Patent, is:

1. A control mechanism comprising, a steering shaft, a gear sector, a rotatable worm in mesh with the sector, a differential coupling between the shaft and the worm, a power control operator, and resilient means actuated by and connected with the differential for operating said control operator when the differential is subjected to abnormal load.

2. A control mechanism comprising, a steering shaft, a gear sector, a worm in constant mesh with the sector and free to rotate with relation to the shaft, a rotatable differential housing, a spider carried by the shaft, a sun gear carried by the worm, pinions carried by the spider in mesh with the sun gear, a control lever carried by the housing, and resilient means interposed between the spider and the housing normally resisting rotation of the housing.

3. A control mechanism comprising, a steering shaft, a gear sector, a worm rotatably mounted on the shaft and engaging the sector, a housing rotatably mounted on the shaft for controlling the application of auxiliary power to the steering sector, means for transmitting motion from the shaft to the worm to rotate the gear sector, and means for changing the transmission of motion from the worm to the housing when a resistance is offered in swinging the sector.

4. A control mechanism comprising, a steering shaft, a gear sector, a rotatable worm in constant mesh with the sector, and a differential gearing directly connected with and interposed between the shaft and the worm for rotating the worm at a faster rate of speed than that at which the shaft is rotated, the sector and the worm having teeth of such pitch as not to increase the normal speed of travel of the sector with relation to the rotation of the steering shaft, whereby backlash between the sector and the worm is eliminated.

5. A control mechanism comprising, a steering shaft, a gear sector, a rotatable worm in mesh with the sector, a differential coupling between the shaft and the worm, a normally dormant power control operator connected with the differential coupling, and means actuated by the differential for resisting the independent operation of said differential coupling until subjected to an abnormal steering load.

6. A control mechanism comprising, a steering shaft, a gear sector, a worm rotatably mounted on the shaft in constant mesh with the sector, a differential housing having an internal gear ring and free to rotate with relation to the shaft, a spider carried by the shaft, a sun gear carried by the worm, pinions carried by the spider in mesh with the sun gear, gears carried by the spider in mesh with the internal gear ring of the differential housing, means actuated by and connected with the housing for resisting the independent rotation thereof until subjected to an abnormal load, and means connected with said housing for controlling the application of auxiliary power to the gear sector.

7. A control mechanism comprising, a steering shaft, a gear sector, a worm in constant mesh with the sector and free to rotate with relation to the shaft, a rotatable differential housing, a spider carried by the shaft, a sun gear carried by the worm, pinions carried by the spider in mesh with the sun gear, a control lever carried by the housing, resilient means interposed between the spider and the housing normally resisting rotation of the housing, and stop means for limiting the rotation of said housing.

8. A control mechanism comprising, a steering shaft, a gear sector, a worm rotatably mounted on the shaft in constant engagement with the sector, a ring gear carried by the worm, a plurality of gears carried by the shaft and engaging said ring gear, a ring gear member rotatably mounted on the shaft and engaged by the gears, a power control operator carried by the ring gear member, and means actuated by and connected with the ring gear member for resisting the independent rotation thereof until subjected to an abnormal steering load.

MORTON H. EDMONDSON.